Figure 1:
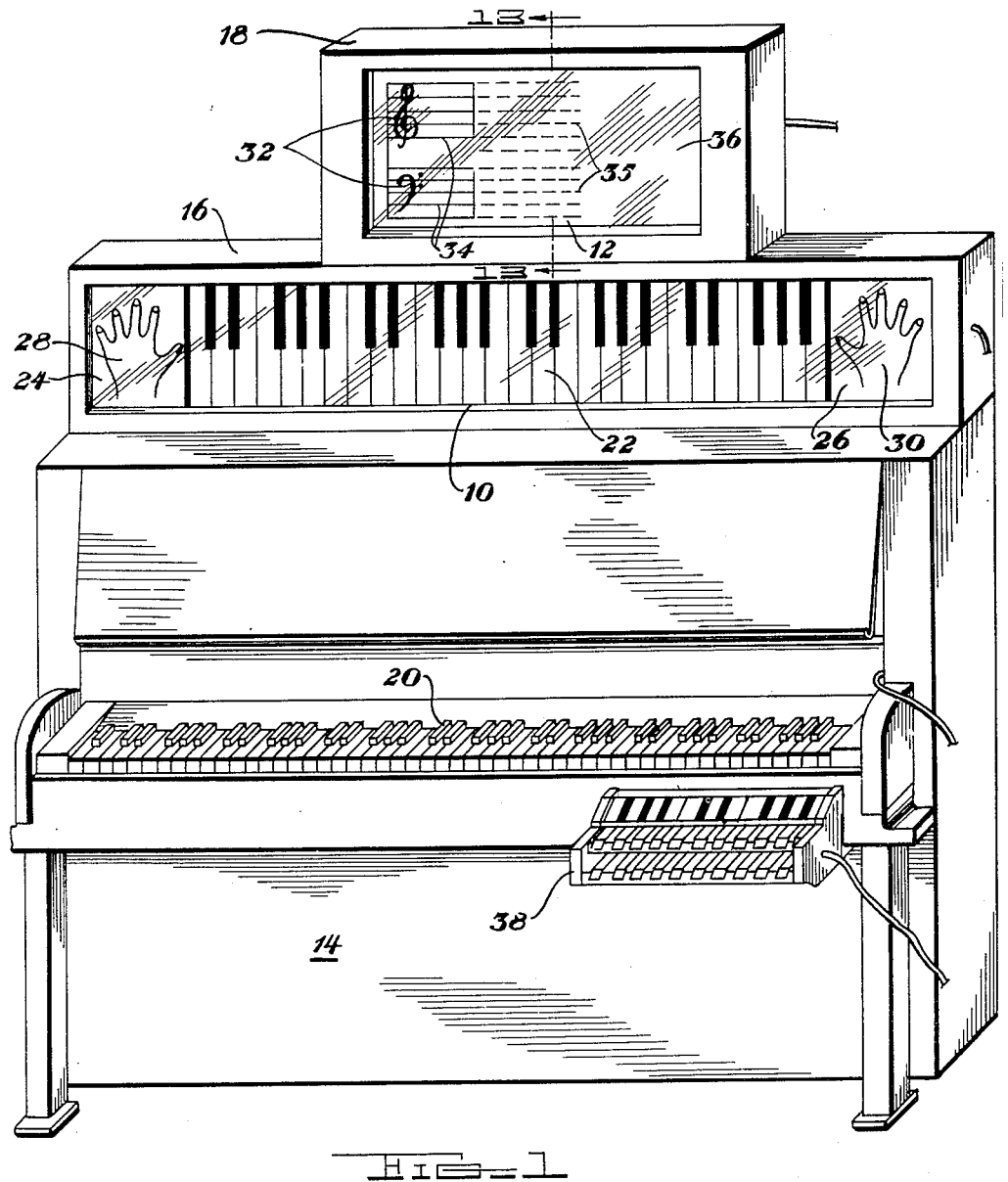

April 3, 1951     E. H. PIERCE ET AL     2,547,535
VISUAL INSTRUCTION DEVICE
Filed March 25, 1946     6 Sheets-Sheet 1

INVENTORS
EDITH HOWSE PIERCE
EDWIN M. SCHANTZ
BY Parker & Burton
ATTORNEYS

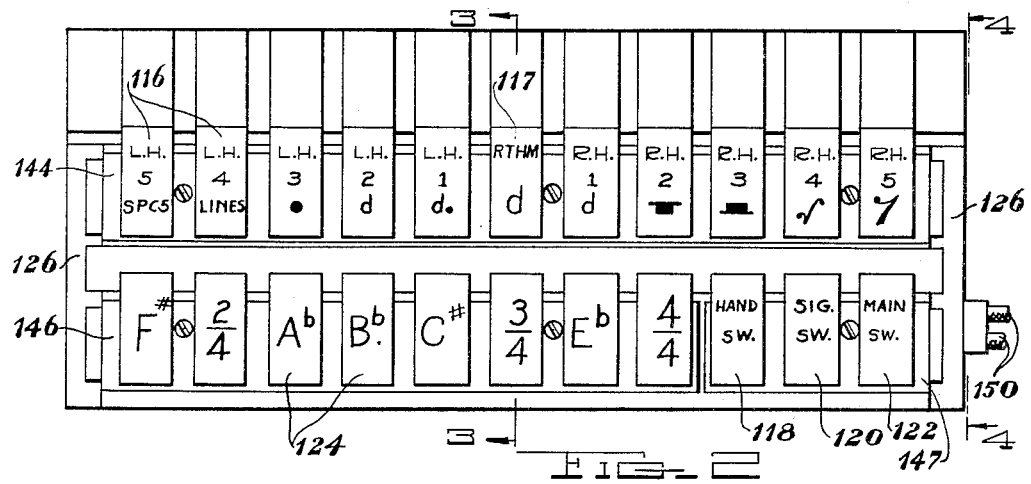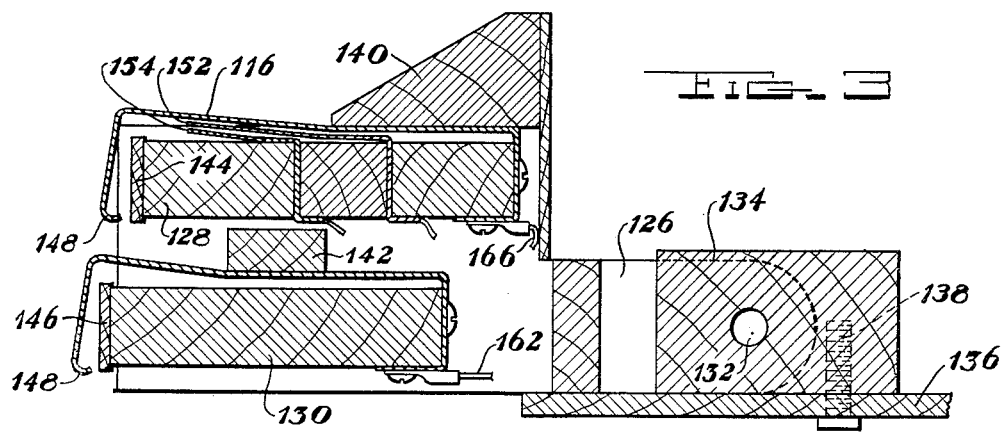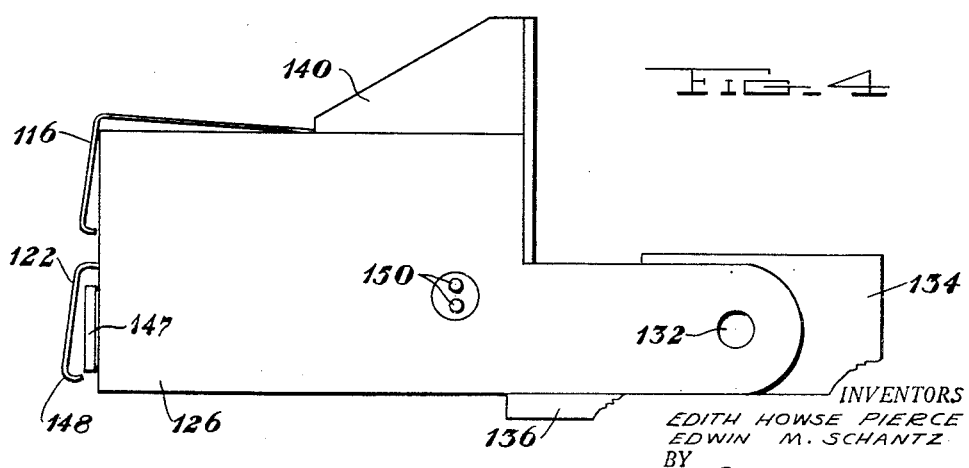

April 3, 1951  E. H. PIERCE ET AL  2,547,535
VISUAL INSTRUCTION DEVICE
Filed March 25, 1946  6 Sheets-Sheet 3
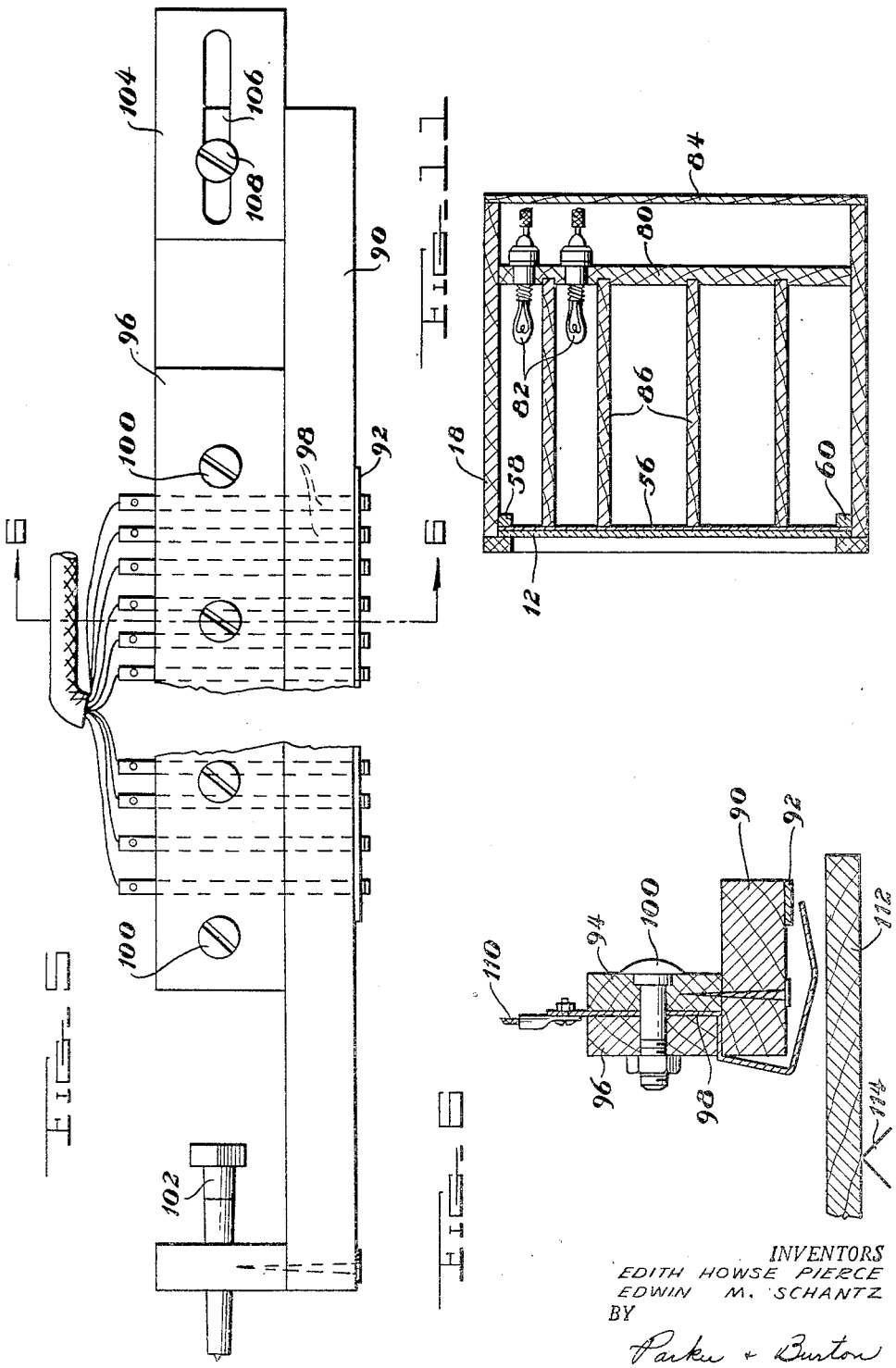
INVENTORS
EDITH HOWSE PIERCE
EDWIN M. SCHANTZ
BY
Parker & Burton
ATTORNEYS April 3, 1951  E. H. PIERCE ET AL  2,547,535
VISUAL INSTRUCTION DEVICE
Filed March 25, 1946  6 Sheets-Sheet 4
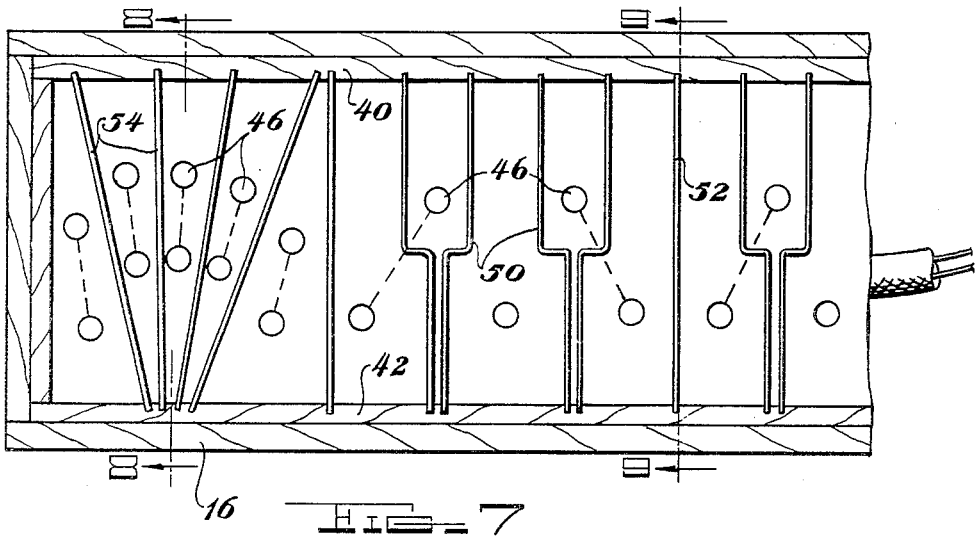
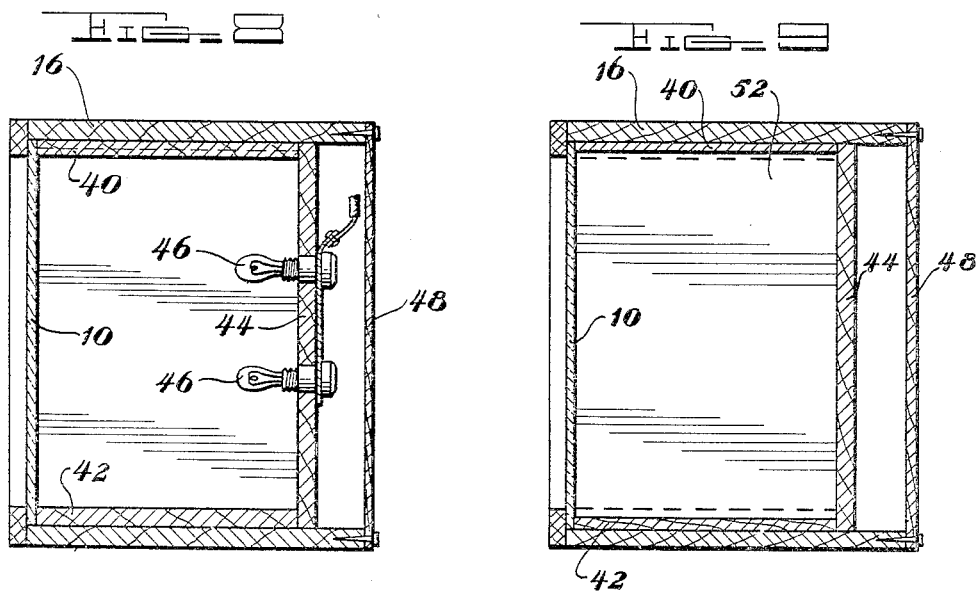
INVENTORS
EDITH HOWSE PIERCE
EDWIN M. SCHANTZ
BY Parker + Burton
ATTORNEYS April 3, 1951     E. H. PIERCE ET AL     2,547,535
VISUAL INSTRUCTION DEVICE
Filed March 25, 1946     6 Sheets—Sheet 5
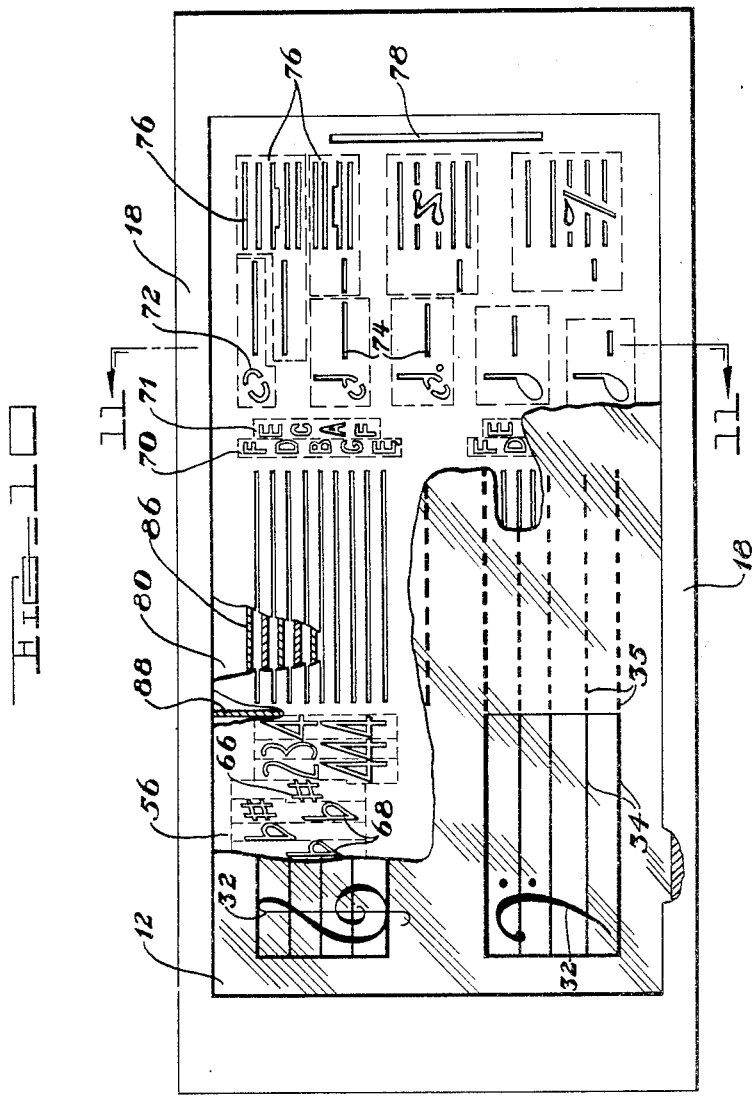
INVENTORS
EDITH HOWSE PIERCE
EDWIN M. SCHANTZ
BY
ATTORNEYS April 3, 1951  E. H. PIERCE ET AL  2,547,535
VISUAL INSTRUCTION DEVICE
Filed March 25, 1946  6 Sheets-Sheet 6
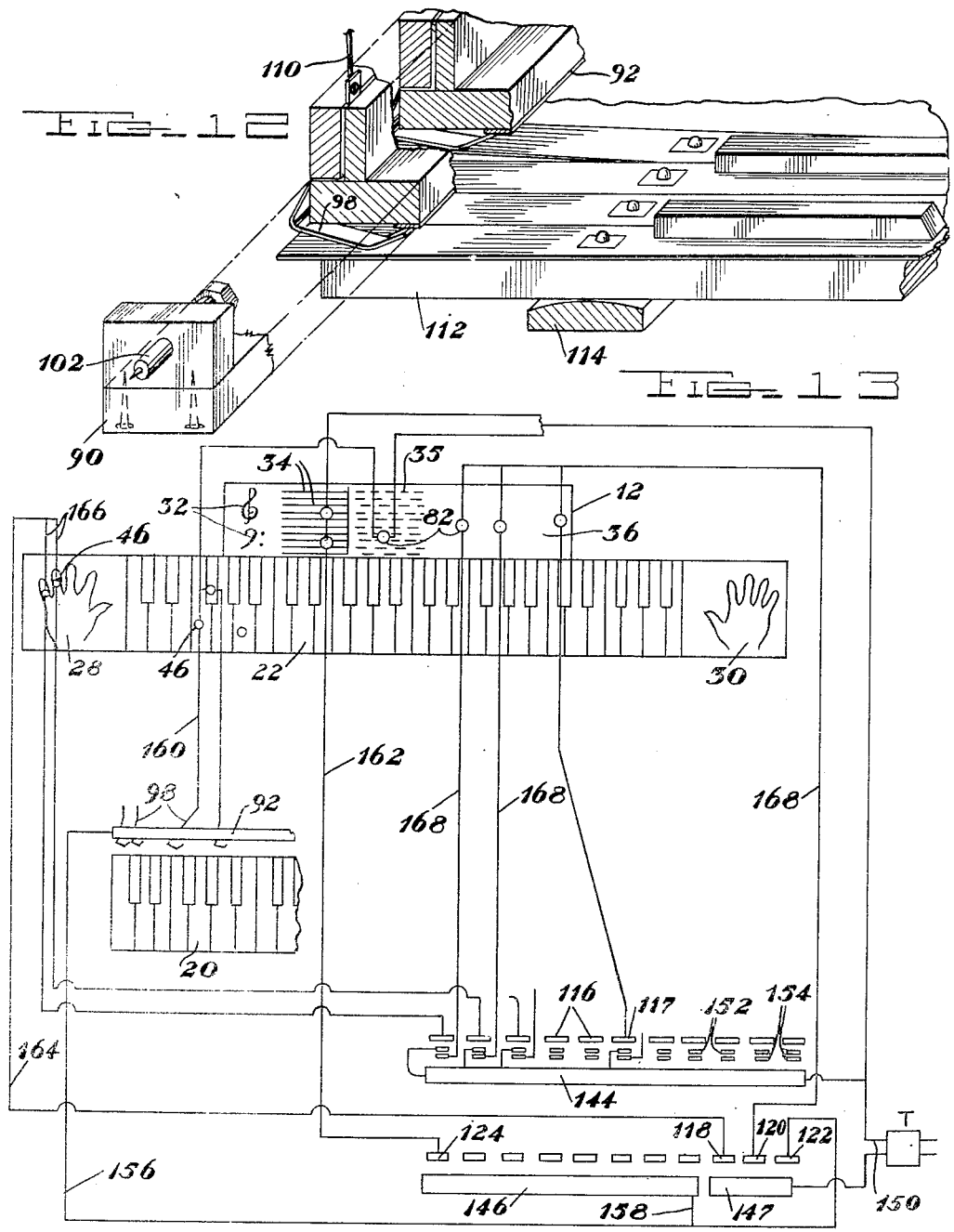
INVENTORS
EDITH HOWSE PIERCE
EDWIN M. SCHANTZ
BY
Parker & Burton
ATTORNEYS Patented Apr. 3, 1951

2,547,535

UNITED STATES PATENT OFFICE 2,547,535

VISUAL INSTRUCTION DEVICE

Edith Howse Pierce, Detroit, Mich., and Edwin M. Schantz, Xenia, Ohio, assignors, by direct and mesne assignments, to Audiscope Corporation, a corporation of Delaware Application March 25, 1946, Serial No. 656,884

7 Claims. (Cl. 84—478)

This invention relates to musical instruction devices and particularly to devices of this character for teaching students the fundamentals of music including the use of musical symbols and notations and the art of playing the piano.

This invention relates to improvements in musical instruction devices of the character illustrated and described in certain United States patents to one of the inventors herein, namely, Nos. 1,324,274; 1,324,275; 1,324,276 and 1,324,277, all dated December 9, 1919, and to improvements in the instruction device illustrated in United States patent to Glen O. Pierce, No. 1,889,418, dated November 29, 1932.

An important object of this invention is to provide an improved apparatus for instructing a class-room of students in the fundamentals of music which readily exhibits to the entire class all the important musical notations and symbols, the sequence of operating the playing elements of the particular musical instrument being taught, and the proper use of the hands in controlling the instrument. Another important object of the invention is to provide a musical instruction device incorporating display means constructed and arranged in a novel manner for expeditiously instructing students in musical education and provided with novel lighting means under the control of the instructor for graphically illuminating any one or more of a plurality of playing elements and musical symbols.

More particularly, an important object of this invention is to provide a novel device for teaching students the art of playing the piano and thereby instructing them in the basic elements of musical composition. This device includes novel means for displaying to a classroom of students various musical characters and representations. Accomplishing this means are novel panel sections arranged in upright position and exhibiting representations of a piano keyboard, the right and left hands, and various musical notations and symbols. Certain of these panel sections carry the representations permanently on their front faces in full view of the class, while other sections are blanked out but by the provision of novel light projecting means various musical characters may be flashed into view. Thus by the combination of permanently displayed musical representations with others which are concealed from view until illuminated under control of the instructor a highly efficacious medium is provided for instructing students in music.

In carrying out the invention it is preferred that an elongated panel board of light permeable material be provided having substantially the length of a conventional piano and adapted to be placed in upright position on top of the piano. Arranged in a novel manner on the front face of the instructing board is a representation of a piano keyboard and on either side thereof representations of the right and left hands. The right hand is on the right side of the keyboard representation; the left hand on the left side of the keyboard representation. Preferably, these representations are permanently displayed and are in full view at all times by the class. Located behind the panel board is lighting means normally in non-use but when operated adapted to illuminate one or more of the keys of the keyboard representation and the digits of the hands. Novel control means including the keys of the piano keyboard and a separate control board are operable by the instructor for separately and independently illuminating the elements on the front face of the panel board.

Associated with the panel board previously described is a second panel board of light permeable material arranged in a novel manner to show on one portion of its front face one or more clefs superimposed on lines of one or more staffs. The balance of the front face of the second panel board is left blank. An important feature of the invention is the provision on the rear face of the board of a sheet having stenciled therein various musical notations and symbols. Novel lighting means similar to that employed for the first panel board is capable upon operation to projectionally illuminate on the front face of the second panel board any one of the notations and symbols stenciled in the sheet. Thus, the students are not confused by a display of many musical characters, but under control of the instructor one or more of these characters may be separately flashed on the blank area of the panel board and the students are not disconcerted by the presence of any other characters. A meritorious feature is the arrangement whereby musical notes may be individually flashed on and between staff lines displayed on the front face of the panel.

Various other objects, advantages and meritorious features of the invention will become more fully apparent from the following specification, appended claims and accompanying drawings wherein:

Figure 1 is a view in elevation of a piano and the instructing device of this invention operatively associated therewith, Figure 2 is a plane view of the instructor's control board, Figure 3 is a cross sectional view along line 3—3 of Figure 2, Figure 4 is an end view of the control board of Figure 2 taken along line 4—4 of Figure 2, Figure 5 is a plane view of electrical contact mechanism mounted in the piano in operable relation to the keyboard thereof, Figure 6 is a cross sectional view of the contact mechanism along line 6—6 of Figure 5, Figure 7 is an interior view of a part of the instruction device showing the arrangement of the parts to provide individual illumination of the keyboard and the hand representations carried thereon, Figure 8 is a cross sectional view along line 8—8 of Figure 7, Figure 9 is a cross sectional view along line 9—9 of Figure 7, Figure 10 is a plane view of the musical notation instructing device partly broken away to show the stenciled sheet and interior construction, Figure 11 is a cross sectional view along line 11—11 of Figure 10, Figure 12 is a perspective view, partly broken away for clarity, illustrating the manner in which the keys of a piano keyboard close the contacts of the assembly in Figure 5, and Figure 13 is a schematic view of the electric circuit employed for operating the instruction device.

In the drawings, the illustrated embodiment of the invention comprises an instruction board means viewable by the class-room taking the form of two panel boards 10 and 12 shown in Figure 1 mounted on top of a piano 14. The panel boards 10 and 12 constitute a vertical side of two rectangular box-like structures, cabinets 16 and 18 respectively and when properly mounted upon the top of a piano or other support face toward the class. The panel board 10 extends substantially the length of the side of a conventional piano having a standard keyboard 20. The front viewable face of the board 10 is divided into sections each permanently displaying representations of certain operating elements associated with a piano.

The central section 22, which extends the greater length of the board has formed thereon in enlarged state a series of keys representing the black and white keys of a conventional piano keyboard. As is evident the keys extend in a vertical direction with the black keys occupying the upper half. Shorter sections 24 and 26 of the panel board 10 are located on either side of the central section and each depicts an open hand thereon. The left section 24 displays the left hand 28; the right section 26 displays the right hand 30. The elongated panel 10 therefore exhibits a portion of a piano keyboard between a right hand representation on one side and a left hand representation on the other side. With the instructor seated at the piano, the panel board 10 is easily visible to the whole class.

The cabinet 18 which carries the panel board 12 is preferably mounted on top of the structure 16, but if desired it may be located in any other position capable of being seen by the class. The panel board 12 has one portion thereof exhibiting one or more clefs 32 superimposed on full lined staffs 34, another portion 35 showing extensions of the staffs in dotted condition, and a third portion 36 normally left blank.

Disposed alongside the instructor when he is seated at the piano is a control board generally indicated at 38 which is described in detail hereinafter. This control board may be separately supported from the floor or attached directly to the piano as shown in Figure 1. The control board 38 and the keyboard 20 are operatively connected to visual signal means located behind the panel boards 10 and 12. Although electrical means is employed in the illustrated embodiment of the invention to operatively connect the keyboard and the control board with electric lighting devices serving as the visual signalling means behind the panel boards, it is understood that other means may be employed falling within the scope of this invention for accomplishing the results thereof.

The interior arrangement of the structure or cabinet 16 having the display panel 10 on the front side thereof is shown in Figures 7, 8, and 9. Within the cabinet are top and bottom supporting members 40 and 42 respectively and a back wall member 44 upon which lighting means in the form of electric bulbs 46 are mounted. Spaced behind the back wall 44 is a removable cover member 48 which conceals the electric wires and connections leading to the light bulbs. Dividing the interior into a plurality of light-tight subsidiary compartments are transverse partitions of various shapes conforming generally to the design to be illuminated on the front face of the panel board 10. Jogged partitions 50 and straight partitions 52 outline the areas occupied by the keys of the keyboard representation 22, the jogged partitions serving to set off the black keys from the white keys. A diverging set of partitions 54 subdivide the area behind the hand representations on either end of the panel board 10. One such set is shown in Figure 7 arranged to form a separate compartment for each finger of the hand. The partition members 50, 52 and 54 are supported in their respective positions by having their top and bottom edges received in narrow transverse slots formed in the top and bottom supports 40 and 42. Each subsidiary compartment is provided with at least one light bulb 46 and it is obvious that when the light bulb is lighted the finger or key representation on the front face of the panel 10 behind which the bulb is disposed is illuminated through the translucent material of the panel.

The interior arrangement of the structure or cabinet 18 having the display panel 12 on one side thereof is shown in Figures 10 and 11. To singly and independently point out one or more musical notations and characters among many without confusion, a special provision is made in the form of a stenciled sheet 56 lying flat against the inside face of the translucent panel 12. The sheet is supported in this position in any suitable way such as supporting pieces 58 and 60 extending along the top and bottom edges of the sheet and by virtue of their connection to the cabinet walls holding the sheet flat against the rear face of the panel board 12. The stenciled sheet preferably extends the length and width of the board 12 as shown and its entire area provided with musical notations and symbols completely cut out or stenciled in the sheet. Figure 10 illustrates one arrangement of the stenciled musical characters. Most of the musical characters stenciled in the sheet are understandable to one skilled in the art but for clarity certain of these are pointed out for future reference.

On the left side of sheet 56 as viewed in Figure aft projecting position illustrated in the drawings supports the frame of the control board in horizontal position but when this member is swung sidewise parallel to the keyboard it will allow the frame to swing downwardly about the pivot 132.

The conducting metallic strips 116, 118, 120, 122 and 124 are secured at their inner ends to the back edges of the supports 128 and 130 in the manner shown in Figure 3 and their forward sections are bent to extend forwardly over the top of these supports and downwardly over the front edge thereof as is clearly shown in Figure 3. Normally these strips are sprung up so that they project upwardly away from the upper surfaces of the two supports 128 and 130 and retaining non-conductive blocks 140 and 142 are provided for limiting this upward movement. Extending along the front sides of the supporting members 128 and 130 are electric conductor bars 144 and 146 respectively. The bar 146 terminates short of the three special control members 118, 120 and 122 and the balance of the front side of the support 130 under these members is provided with a separate conductor bar 147. The clearance between each strip and its supporting member enables the strip to be depressed, and in order to hold each strip in depressed condition the free end thereof is curled under at 148 for engagement with the depending lower edge of the conducting bar with which the strip is associated. The formation of each strip with its curled end 148 enables the strip either to momentarily close an electric circuit or when the curled end is engaged with the conductor bar to hold the circuit closed for as long a period as desired by the instructor. The conductor bars 144 and 147 are connected to a source of electric current and wires leading therefrom to the bars are shown at 150.

Between each strip 116 of the control board and the top surface of the support 128 are a pair of subsidiary strips or contacts 152 and 154 which are electrically brought into contact with one another and the strip 116 when the latter is fully depressed or is held down by its curled end 148 in the manner described above. These subsidiary strips 152 and 154 cooperate with their respective control strips 116 to illuminate either the digits on the hand representations or certain musical notations on the panel board 12 in the manner hereinafter described.

As previously mentioned the series of control members or strips 116 of the top row of the control board are with the exception of the middle member arranged in positions corresponding to the fingers of the left and right hands. They are so labeled by indicating means printed or otherwise formed on their exposed surfaces. As shown in Figure 2, the letters "L. H." and "R. H." on these strips indicate respectively the left and the right hand. The numerals 1 to 5 on these strips below these markings designate the digits of either the left or right hand counting from the thumbs to the small fingers of each hand. The middle strip 117 of this row designated "RTHM" has a special function not associated with the fingers of the hand representations. Below the finger designations on the strips, each strip carries another identifying label representing one of various musical notations and characters which are to be flashed on the panel sections.

By a novel provision each control strip 116 is capable upon being depressed to illuminate either a finger on the hand representations or flash a musical character on a panel section. This is accomplished by providing master switches for this series of strips. The electric circuits are so arranged that when the special control strip 118 bearing the designation "Hand Sw." is held down the control strips 116 are capable of illuminating the fingers of the hand representations 28 and 30 on panel board 10, and when the special control strip 120 bearing the designation "Sig.Sw." is held down the strips 116 are capable of flashing any one of the musical characters indicated thereon upon the blank section 36 of panel board 12. The upper series of control members 116 therefore have a dual function and either one or both functions become operable upon holding down the main switches 118 and 120, thus conserving in space and material.

The special master control member 122 designated "Main Sw." has a similar role. When depressed and held down, the keys of the piano keyboard 20 are operative to flash their corresponding keys on the keyboard panel representation 22 and the lower bank of control strips 124 are operative to flash the musical characters identified on their exposed surfaces upon the panel screen 12.

A schematic view of the circuits employed to control the instruction device is illustrated in Figure 13. Not all the circuits are illustrated but only those which are representative of the others are shown. A transformer T connected to any suitable electric power source is provided with the leads 150 which are separately connected to the conductor bars 144 and 147. The conductor bar 92 of the contact assembly associated with the keyboard 20 is connected by lead 156 to the main switch control member 122. A branch lead 158 connects the conductor bar 146 to lead 156.

When the master control member 122 is depressed into contact with the conductor bar 147 thereunder, and if desired held thereto by engagement of its curled end 148 therewith, a circuit is completed to the conductor bar 146 of the control board 38 and the conductor bar 92 of the piano keyboard contact assembly. Depression of a key on the piano keyboard 20 causes its corresponding strip 98 to contact bar 92 as previously described. A lead 160 further extends to each strip 98 to a light bulb 46 behind its corresponding key representation on panel 10 and causes it to illuminate the key. Lead 160 further extends to a light bulb 82 disposed behind the dotted staff section 35 of the panel 12 and causes it to flash a horizontal white light on the staff corresponding to the position of the key on the keyboard. Lead 160 returns to the opposite side of the source of electric current as indicated in Figure 13 to complete the circuit.

Each control member or strip 124 is connected by a lead 162 to a light bulb 82 behind the full lined staff section 34 of panel 12. If it is desired to flash the musical character exhibited on the strip upon the staff of panel 12, depression of such strip into engagement with the conductor bar 146 will cause current flow to the bulb 82 to which it is connected and the notation stenciled in the sheet 56 opposite the bulb will be flashed on the panel 12.

When the master control member 118 is depressed into engagement with the conductor bar 147, any one or more of the digits of the hand representations may be illuminated by depression of the members 116 of the upper bank of 10 a treble clef and a base clef are stenciled which coincide in position with the treble and base clefs 32 permanently displayed on the front face of the panel 12. Sharps stenciled in the sheet are indicated at 66, flats at 68. Two vertical rows of fundamental notes are stenciled at 70 to appear at the right of the dotted staffs 35 permanently displayed on the front face of the panel 12 and in line with scale lines and spaces therebetween. Whole notes, half notes, quarter notes, etc., are stenciled in a vertical row on the sheet at 72. Stenciled in the sheet is a vertical series of horizontal bars 74 of various lengths for denoting the time of the notes. Similarly a vertical series of horizontal bars 76 are stenciled to represent musical rests. The separate vertical stencil 78 serves to represent the rhythm bar.

The stenciled characters in the sheet 56 are capable of being separately and independently illuminated in a manner similar to those described in connection with the panel board 10 of Figures 7 to 9. The cabinet 18 is subdivided into a plurality of light-tight compartments opening out on the rear face of the panel 12 and arranged in various sizes and shapes to conform to the particular musical character to be illuminated. As shown in Figure 11 a back wall 180 carries a plurality of electric light bulbs 82. Beyond this wall in spaced relation thereto is a member 84 serving as a removable cover for the electric leads and connections to the light bulbs. Between the back 80 and the front panel 12 are a plurality of horizontal and vertical partition members 86 and 88 respectively which subdivide the cabinet in the manner previously described. In each compartment is one or more bulbs 82. The dotted lines enclosing one or more of the musical symbols illustrated in Figure 10 show the arrangement of the partition members behind the stenciled sheet to flash the symbols either singly or in groups. The sharps, flats and time symbols carried on the stenciled sheet behind the staffs of the treble clef are also repeated behind the staffs of the bass clef.

The keys of the keyboard representation 22 and the digits of the hand representations 28 on the panel 10 are independently illuminated by novel control means operatively associated with the keys of the piano keyboard 20 and the control members of the control board 38. Figures 5, 6, and 12 illustrate the preferred method of controlling the keyboard representation 22 from the keyboard of the piano. Located inside the piano along the rear ends of the keys of the piano keyboard is an electrical contact assembly consisting of an elongated member 90 carrying an electric conductor or bar 92 extending the major portion of the length thereof and connected to a source of electric current. Secured to one edge of this member at right angles thereto to form an L-shaped structure are a pair of members 94 and 96 clamping therebetween a plurality of electrically conductive flexible metal strips 98 corresponding in number and position to the keys in a section of the piano keyboard 20. Bolt and nut assemblies 100 secure the two members together to clamp the strips therebetween. The two clamped members 94 and 96 and the member 90 are made of non-conductive material. The clamped members extend to one end of the member 90 but fall short of the other end. The latter end of member 90 is provided with a threaded bolt 102 having a sharpened end for biting into the wood work of one side of the piano to hold this end in position. Attached to the other end of the clamped members is a longitudinally adjustable mmeber 104 which is extensible beyond the member 90 by reason of a slot 106 and bolt 108 therethrough for engagement with the other side of the piano to hold the assembly in position. This enables the contact assembly to be adjusted to fit pianos of different sizes.

The flexible metal strips 98 extend from between the clamping members 94 and 96 and are bent as shown in Figure 6 to extend around to the forward side of member 90 in position for their free ends to engage the conducting bar 92. The clamped ends of the strips project from between the members 94 and 96 and to each strip an electric wire 110 is connected. Each strip at an intermediate portion of its length is bent so as to extend away from the body 90 and into position to be engaged by the inner rear end of a key of the keyboard 20. Figure 12 illustrates this condition. As shown, each key 112 is rockingly supported on a longitudinal member 114 extending the length of the keyboard. The arrangement of the parts is such that upon playing or depressing a key 112, the remote inner end will rise and abut the strip 98 in line therewith and cause it to swing into engagement with the conductor 92 as indicated by one of the strips in Figure 12. This action closes an electric circuit extending to the light bulb 46 behind the corresponding key representation on the panel section 22. Each black and white key is provided with a contact device of this character and in this manner the instructor by depressing one or more keys on the piano keyboard is able to illuminate the corresponding key or keys on the keyboard representation 22.

The control board 38 is illustrated in detail in Figures 2, 3 and 4. This control board consists of a plurality of depressible members arranged in two tiers or rows and carrying identifying characters thereon. The control members in the upper tier or row with the exception of the middle one are indicated by reference numeral 116 and preferably are in number as many as the fingers of the left and right hands. Actually in the present embodiment of the invention there are eleven such control members with the middle one referred to by reference numeral 117 serving a special function. Three special master control members at the right of the bottom row are designated by reference numerals 118, 120 and 122. The balance of the control members in this row are referred to by reference numeral 124. Each control member consists of an electrically conductive flexible metal strip and in depressed condition is adapted to close one or more electric circuits.

The control board frame consists of two vertical side supporting members 126—126 carrying therebetween two horizontal members 128 and 130 (Figure 3) of non-conductive material. The latter are arranged one above the other and form supports for the two rows of control members or strips. A novel provision hingedly connects the two side supports 126—126 to the piano. As shown in Figure 4, the side supports are pivoted at 132 to a block 134 attached to the underside of the keyboard assembly of the piano, and in non-use the control board can be swung out of the way to a vertical position under the keyboard. Any suitable means may be provided for releasibly holding the control board in horizontal operative position. As shown in Figure 3, a member 136 is pivoted to the underside of block 134 about a vertical pin 138 and in the fore and the control board. A primary lead 164 extends from the control member 118 to each hand representation 28 and 30 (only one such lead is shown in Figure 13) where it is subdivided into a plurality of secondary leads 166 extending to the light bulbs 46 behind the fingers of the displayed hands. From thence, each lead 166 extends to its corresponding control member 116. Contact of any one of the latter with the subsidiary strips 152 thereunder or with the conductor bar 144 will complete the circuit. Contact with subsidiary strips 154 in this operation is ineffectual because its master control member 120 is open.

When the master control member 120 is depressed into contact with conductor bar 147 a circuit is set up which upon full depression of any one of the control members 116 will flash a musical character on the blank section 36 of the panel board 12. Each subsidiary strip 154 is connected to a light bulb 82 behind the blank section 36 by a lead 168. This lead returns separately or merged with others of its kind beyond the bulbs to the master control member 120. With the latter in engagement with bar 147, this circuit is completed by contact of any one of the subsidiary strips 152 with its associated subsidiary strip 154, and this occurs as previously explained upon full depression of any one of the control members 116. The middle control member 117 of this series is connected to the light source behind the vertical rhythm bar 78 at the extreme right of panel 12 and depression thereof into engagement with its subsidiary strip 152 will illuminate the rhythm bar. By this novel feature the instructor is able by short or prolonged tapping of control member 117 to flash the desired rhythm on the screen. It is thus apparent that the upper row of switch members 116 of the control board are capable of two separate or simultaneous functions of illuminating the fingers of the hand representations and projecting musical characters and symbols on the panel screen 12.

In teaching a class of students, the usual procedure is for the instructor to sit at the piano and with the control board 38 in extended position operate the keys of the keyboard and the operating members of the control board. It is desirable to provide each student with a dummy keyboard. With the master control switch 122 on the control board held down either manually or by engagement with the conductor bar 147 it is possible for the instructor to manipulate the keys on the piano keyboard and simultaneously flash the keys played on the keyboard representation 22. At the same time, or as a separate operation, the instructor can flash the fingers of the hands used in playing the keys of the piano keyboard. This is accomplished by holding down the master control switch 118 of the control board and depressing the control members 116. The instructor may use the left hand to play the piano keyboard and the right hand to manipulate the digit control members 116. In this manner, the students will see the key played on the keyboard representation 22 and the fingers used on the panel sections 24 and 26. With the master control switch 122 held down it is possible for the instructor to flash on the area 32 the various key signatures and time signatures indicated on the control strips 124 by depressing these strips into contact with the conductor bar 146.

When it is desired to instruct the students in the kinds of notes, rests and other musical symbols, the instructor depresses the master control switch 120 into interlocking engagement with the conductor bar 147 and upon depression of the control strips 116 there is flashed into view on the blank area 36 of the panel display means the various musical symbols indicated on these strips. To indicate the rhythm, the instructor depresses the middle control strip 117 and by short or long depression of the strip is able to flash the vertical stenciled band or bar 78 on the front face of the panel.

An important feature of the invention is the provision for indicating the notes played on the piano keyboard by horizontally directed bands or streaks of light across the central area 35 of the panel 12. In non use, the staff lines are dotted in this area as indicated in Figs. 1 and 10. When the piano keyboard is played with the master control switch 122 closed, not only are the key representations lighted on the panel 22 but streaks or bands of light are flashed on or between the dotted staff lines of the area 35. The position of these streaks of light on the staff correspond to the position of the note on the musical scale. The superimposition of the horizontal streaks of light on the dotted staff lines is to be preferred to the showing of the notes themselves as the keys are played. The relative position of the notes in the musical scale are more quickly grasped by the students in this manner. When it is desired to flash the notes for instruction either one or both of the two left most strips 116 of the upper tier of the control board may be depressed for this purpose.

What we claim is:

1. A music instructing device comprising, in combination, means displaying a series of musical symbols and the right and left hands, a series of control members to be manually operated, electric circuit means connecting said control members with said display means and adapted upon operation of any one member to flash a signal to any one of said musical symbols and upon any one of the digits of the hands displayed, and switch means controlling said electric circuit means and adapted to electrically connect said control members to said musical symbols to flash the same or to electrically connect the control members to said digits to flash the same.

2. A piano instruction device comprising, in combination, an elongated panel board of light translucent material, divided horizontally into three sections consisting of a longer central section displaying on the front face thereof a representation of a piano keyboard and two shorter sections on either end of the longer section displaying on the front face of one of the shorter sections a representation of a right hand and on the front face of the other shorter section a representation of the left hand, and electric lighting means disposed along the back face of said panel board in position to independently illuminate the keys of said keyboard representation and the fingers of said hand representations.

3. Piano instruction apparatus comprising, in combination, an elongated horizontal panel board of light translucent material divided horizontally into a relatively long central section having displayed on the front face thereof a representation of a piano keyboard and two relatively short sections on either side of said central section displaying on the front face thereof a representation of a right hand on one of the shorter sections and a representation of a left hand on the other of the shorter sections, a second panel board of light translucent material having displayed on one portion of the front face thereof a representation of a musical signature chart, the balance of said second panel board having a relatively opaque sheet bearing against the back face thereof and stenciled with various representations of musical symbols, and controlled electric lighting means disposed along the back faces of said panel boards and associated with each key of said keyboard representation for illuminating the keys of the keyboard representation, the fingers of the hand representations and the musical symbol representations.

4. A musical instructing device comprising, in combination, panel board means displaying a plurality of different musical symbols and the right and left hands including the fingers thereof, a series of control members to be manually operated, indicia means carried on each control member indicating a musical symbol displayed on said panel board means and a finger of one of the hands displayed on said panel board means, means adapted upon operation of any one of said members to flash a signal upon the musical symbol and the finger represented thereon by said indicia means, and means for selectively presetting said control members for flashing signals on said musical symbols or for flashing signals on the fingers of said hands.

5. A musical instructing device, comprising, in combination, a panel board means displaying a plurality of different musical notations and the right and left hands, electric lighting means associated with each of said notations and with each of the digits of said hands, a control board having a row of ten manually operable members, each member of said board corresponding to one of said musical notations and to one of the digits of said hands and bearing indicia means indicating the musical notation and the digit to which it refers, an electric circuit connecting each of said control members to the lighting means associated with its corresponding notation and a separate electric circuit connecting each of the control members with its corresponding digit, said separate circuits upon operation of any one member adapted to illuminate the lighting means to which the same are connected, and electric switch means for said control board for selectively electrically connecting said members to the circuits for said musical notations to illuminate the same or to said circuits for illuminating the digits of said hands.

6. In combination with a piano, a piano instruction device comprising a panel board section of light translucent material having on its front viewable face a right hand representation and a left hand representation and a second panel board section bearing a normally blank area upon which one or more different musical symbols are displayable on the front viewable face thereof, a control board attached to said piano having a plurality of depressible members corresponding in number and position to the fingers of said right and left hand representations, said depressible members each having indicia means indicating the finger with which it is associated and one of the musical symbols of said second panel board section, an electric circuit operatively associated with each of said members of the control board and with a source of light located behind said first panel board section opposite to the corresponding finger of said hand representations to which the member relates, a separate electric circuit operatively associated with each of said members of the control board and with a source of light located behind said second panel board section opposite to the musical symbol to which the member relates, means operable upon depression of any one of said members to close the two circuits associated therewith to illuminate its corresponding finger on the hand representations and to illuminate its corresponding musical symbol, and switch means for cutting out either one of the two circuits associated with each of said members while leaving the other circuit operable by the member.

7. A device for class instruction in the art of playing musical instruments comprising, in combination, an upright horizontally elongated panel board of light permeable material adapted to be mounted so as to display one side to a class room, means dividing the display side of the panel board into three horizontally separated sections consisting of a longer central section upon which a musical representation is displayed and of two shorter end sections, a right hand representation displayed by one of said shorter end sections and a left hand representation displayed by the other section, and means carried by the panel board and disposed on the side opposite to said display side for separately illuminating the fingers of the displayed hands and parts of the displayed musical representation through the material of the panel board.

EDITH HOWSE PIERCE.
EDWIN M. SCHANTZ.

REFERENCES CITED

The following references are of record in the file of this patent:

UNITED STATES PATENTS

| Number | Name | Date |
|---|---|---|
| 1,239,609 | Little | Sept. 11, 1917 |
| 1,268,376 | Miessner et al. | June 4, 1918 |
| 1,458,460 | Arnoll | June 12, 1923 |
| 1,889,418 | Pierce | Nov. 29, 1932 |
| 2,122,643 | Golemb | July 5, 1938 |
| 2,188,098 | Bostelmann | Jan. 23, 1940 |
| 2,207,639 | Schrems | July 9, 1940 |
| 2,225,084 | Pierce | Dec. 17, 1940 |

FOREIGN PATENTS

| Number | Country | Date |
|---|---|---|
| 378,070 | Great Britain | Aug. 2, 1932 |